Aug. 29, 1939.   C. R. BERGEVIN ET AL   2,170,984
SPRING COILING MACHINE
Filed Nov. 7, 1938   5 Sheets-Sheet 1

Inventors:
Charles R. Bergevin
Elmer W. Halvorsen
By Owen W. Kennedy
Attorney

Fig. 2.

Aug. 29, 1939. C. R. BERGEVIN ET AL 2,170,984
SPRING COILING MACHINE
Filed Nov. 7, 1938   5 Sheets-Sheet 3

Aug. 29, 1939. C. R. BERGEVIN ET AL 2,170,984
SPRING COILING MACHINE
Filed Nov. 7, 1938 5 Sheets-Sheet 4

Inventors:
Charles R. Bergevin
Elmer W. Halvorsen
By Owen W. Kennedy
Attorney

Inventors:
Charles R. Bergevin
Elmer N. Halvorsen
By Owen W. Kennedy
Attorney

Patented Aug. 29, 1939

2,170,984

UNITED STATES PATENT OFFICE 2,170,984

SPRING COILING MACHINE

Charles R. Bergevin and Elmer W. Halvorsen, Torrington, Conn., assignors to The Torrington Manufacturing Company, Torrington, Conn., a corporation of Connecticut Application November 7, 1938, Serial No. 239,302

16 Claims. (Cl. 140—79)

The present invention relates to spring coiling machines, of the type adapted to intermittently feed predetermined lengths of wire for coiling into springs of different forms, the completed springs being severed in the intervals between successive operations of the feeding devices.

Spring coiling machines of this general character are known in the trade as universal coilers, by reason of the ability of such machines to produce springs of different forms, that is springs with either open or closed convolutions, of barrel or cone shape, or with portions of different diameters. Springs having the above mentioned forms are usually known as tension of compression springs, with their end convolutions cut off 'square, and a universal coiling machine for producing springs of this type is shown in Bergevin & Nigro Patent No. 2,119,002, issued May 31, 1938.

The object of the present invention is to provide a universal coiling machine of the above indicated type, with an improved mechanism and mode of operation, whereby the machine is capable of producing not only tension or compression springs of various forms, but also what are known in the trade as torsion springs. Torsion springs are characterized by the provision of uncoiled ends extending at an angle to the spring axis, for desired attachment of the spring, and the present invention contemplates automatic control of the wire feeding and coiling operations of a coiling machine, whereby extended ends of predetermined length may be formed on springs having any desired number of convolutions.

The above and other advantageous features of the invention will hereinafter more fully appear from the following description, considered in connection with the accompanying drawings, in which.

Like reference characters refer to like parts in the different figures.

Figure 1:
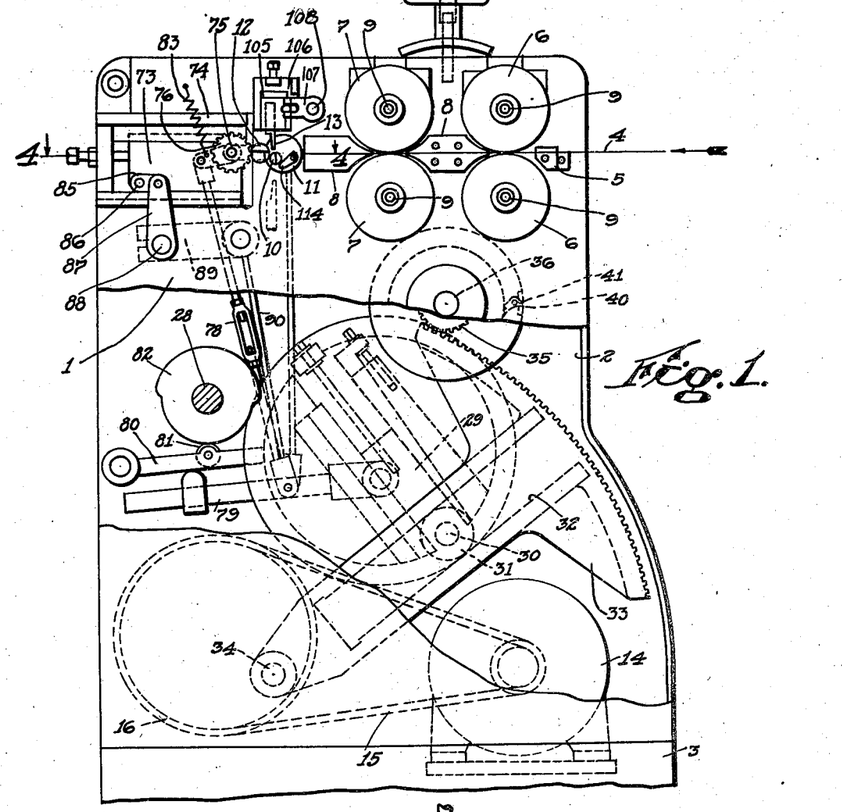
Fig. 1 is a view in front elevation, of a coiling machine embodying the invention.

In the above described drawings, the machine and method of the present invention are shown, for purposes of illustration, as being incorporated in a universal spring coiling machine having the same general capabilities as the machine disclosed in the aforementioned Patent No. 2,119,002, although it will be readily understood that the mechanisms for controlling the wire feed and coiling tools to obtain the coiling of springs with extended ends, can be as well embodied in other spring coiling machines, such as so-called clutch-type coilers. Referring to Fig. 1, the machine consists of spaced upright frame members 1 and 2 mounted on a suitable base 3, with the various wire feeding, coiling, and severing tools mounted on the front frame member 1, and the several mechanisms for driving the tools mounted between the members 1 and 2. The line of feed for the wire 4 is indicated by the arrow in Fig. 1, the wire being fed through a preliminary guide 5 to cooperating pairs of feed rolls 6, 6 and 7, 7, which rolls project the wire forward for operation upon by the coiling tools. Wire guides 8 are provided between the feed rolls 6 and 7, as well as between the feed rolls and coiling tools, and both the rolls and guides are provided with grooves of different sizes, so that a considerable range of wire sizes may be handled by the machine.

Figure 3:
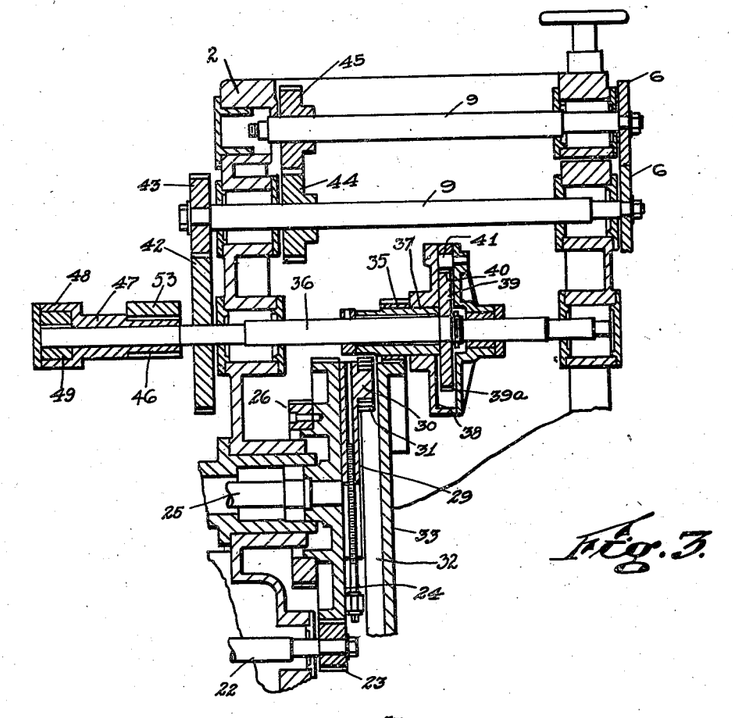
Fig. 3 is a fragmentary sectional view, illustrating the drive for the feed rolls.

The feed rolls 6 and 7 are carried by shafts 9 journalled in the frames 1 and 2, the shafts 9 being geared together for synchronous rotation, as shown in Fig. 3, and are adapted to be driven intermittently in one direction of rotation, in a manner hereinafter described. As the wire 4 is gripped between the feed rolls 6 and 7 and is fed forward, it passes over, or under, an arbor 10, in accordance with the adjustment of the coiling tools to produce either a right or a left-hand spring. The arbor 10 is carried by a tool holder 11, in which it is longitudinally movable, for a purpose which will be hereinafter described.

Figures 7, 8, 9, 10, 11, 12, 13, 14:
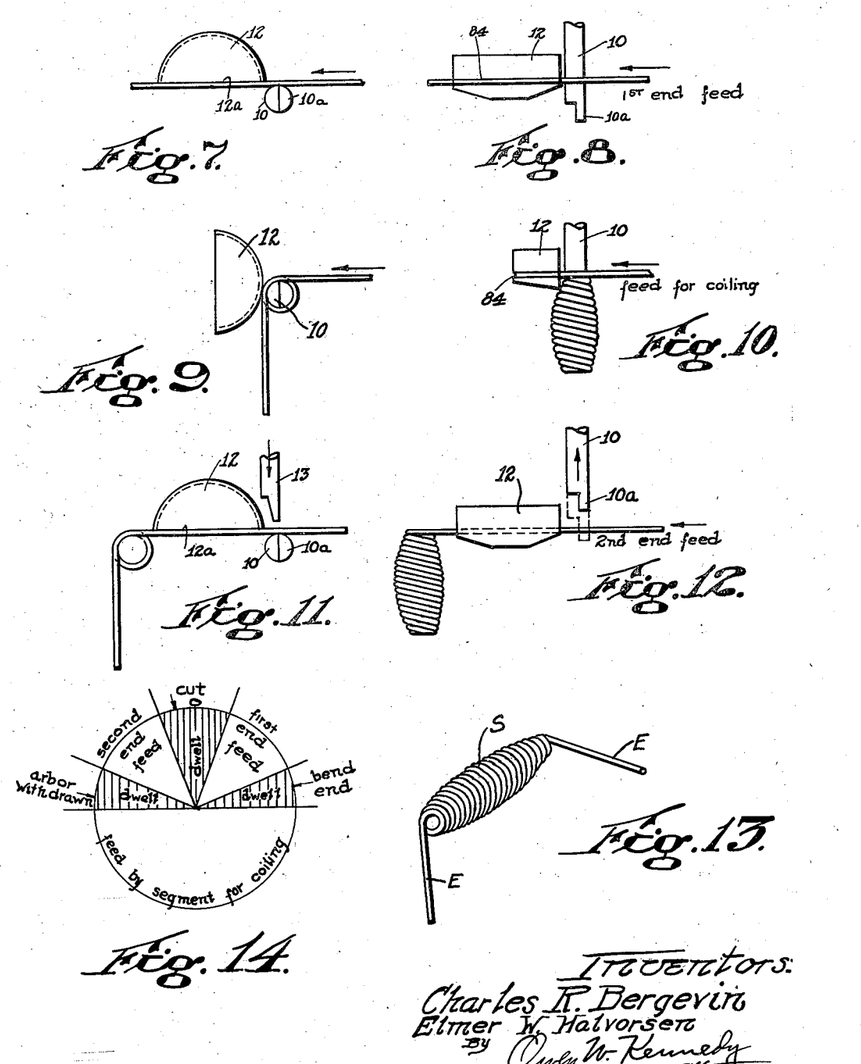
Figs. 7–12, inclusive, are diagrammatic views, illustrating the several steps in the formation of a spring with straight ends.
Fig. 13 illustrates a completed spring.
Fig. 14 is a schematic diagram, illustrating the time relation between various steps in the spring forming cycle.

In the formation of a torsion spring with extended ends, as contemplated by the present invention, the wire 4 is fed forward past the arbor 10, and under, or over, a coiling abutment 12, in accordance with whether a right or left-hand spring is to be coiled. When a predetermined length of wire has thus been fed past the arbor 10, the feed rolls 6 and 7 stop and the abutment 12 is rotated, so as to deflect the previously fed end around the arbor 10, as indicated in Fig. 9. Resumed rotation of the feed rolls then causes the abutment 12 to deflect the wire into a coil, and the coiling continues until the desired length of spring has been formed, whereupon rotation of the feed rolls again ceases.

The abutment 12 is then turned in the reverse direction, back into its original position out of the line of wire feed, and after the arbor 10 has been retracted in the tool holder 11, further rotation of the feed rolls 6 and 7 causes the entire spring with one extended end to be projected laterally past the abutment 12, until the desired length of wire has been fed, to provide for the other extended end, see Figs. 11 and 12.

After shifting of the wound spring, the feed rolls again stop, and the arbor 10 is moved partially back, with a reduced cutting nose 10a of the arbor beneath the wire, after which the coil is severed by the operation of a reciprocatory cutting tool 13, disposed in retracted position above the arbor 10, when a right-hand spring is being coiled. As indicated in dotted lines in Fig. 1, a second cutting tool 13 is similarly mounted below the arbor 10, for operation when a left-hand spring is formed. The operation of one or the other of the cutting tools 13 completes the cycle to form a spring with two extended ends, as shown in Fig. 13, and at the end of the cycle all parts return to the position of Figs. 1, 7 and 8, in readiness for the feeding, coiling and severing of another spring.

Having outlined above the general functioning of the essential elements and sequence of operations entering into the formation of a spring, in accordance with the present invention, there will next be described, in the order named, (a) the feed roll drive, to cause feeding of the wire in three distinct stages, (b) the coiling abutment control, to permit direct wire feeding before and after coiling, and (c) the coiling arbor control, to provide for coiling, shifting of the coil, and cutting thereof.

*Feed roll drive*

Figure 2:
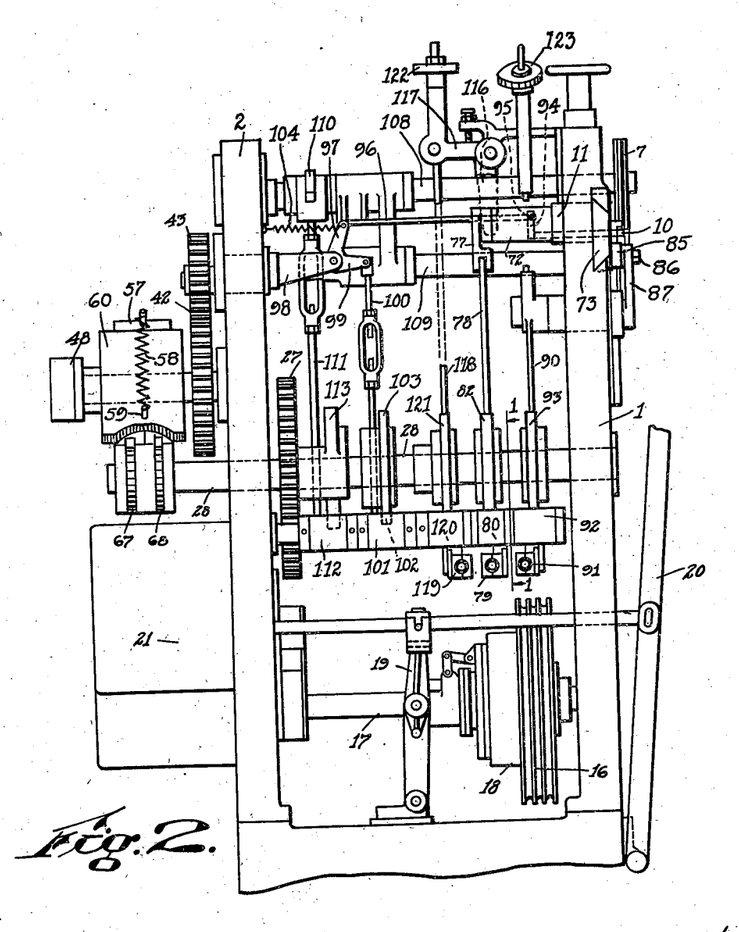
Fig. 2 is a side elevation of the machine of Fig. 1, as viewed from the left.

The machine is driven from any suitable source of power, such as a motor 14 connected by a belt 15 to a pulley 16. As best shown in Fig. 2, the pulley 16 is adapted to be connected to a shaft 17 by means of a clutch 18 operable by a fork 19 connected to a lever 20 mounted at the front of the machine. The pulley shaft 17 extends into a housing 21 containing selective change speed gearing, of any suitable type, through which rotation of the shaft 17 is converted into rotation of a drive shaft 22, at different speeds, see Fig. 3.

The shaft 22 extends through the housing 21 and carries a pinion 23 in mesh with a gear 24 mounted on a shaft 25. The gear 24 carries a gear 26 of smaller diameter, which is in mesh with a gear 27 mounted on a cam shaft 28, see Fig. 2, to drive the shaft 28 continuously, for operating the coiling tools and cutters, in a manner hereinafter described. Rotation of the gear 24 is also adapted to be converted into intermittent rotation of the feed roll shafts 9 by a crank connection and gearing, so designed as to control the wire feed, within a wide range.

To this end, the front face of the gear 24 carries a crank block 29, providing a crank pin 30, on which is mounted an anti-friction bearing 31. As best shown in Fig. 1, the outer raceway of the bearing 31 fits between the parallel walls of a slot 32, provided in a gear segment 33 pivoted on a rock shaft 34. Therefore, circular motion of the gear 24 is transmitted through the crank pin 30 and bearing 31 to the segment 33 without appreciable friction, and causes the segment to oscillate across the face of the gear 24, the amplitude of movement of the segment 33 being proportional to the distance that the pin 30 is positioned away from the axis of the shaft 25, on which the gear 24 is mounted. Teeth formed on the outer circumference of the segment 33, engage the teeth of a pinion 35 loosely mounted on a shaft 36 parallel to the feed roll shafts 9, so that the pinion 35 is rotatably driven in opposite directions, as the segment 33 oscillates on the rock shaft 34.

The pinion 35 forms part of a sleeve 37, free to turn on the shaft 36, and the sleeve carries a flange 38 surrounding a toothed ratchet wheel 39 mounted to turn with the shaft 36. As indicated in dotted lines in Fig. 1, a pawl 40 is pivotally supported on a pin 41, movable with the flange 38, and is so constructed as to engage teeth 39a on the ratchet wheel 39 in one direction of movement of the pinion 35 by the segment 33, see Fig. 3. Therefore, for each complete oscillation of the segment 33, the shaft 36 is turned through a predetermined angle, as the segment is turned in one direction, after which the shaft 36 remains stationary, as the segment is turned in the opposite direction.

The shaft 36 extends through the rear frame 2, and carries a gear 42 in mesh with gears 43 carried by the lower feed roll shafts 9. These shafts 9 also carry gears 44 inside the frame 2, in mesh with gears 45 mounted on the upper feed roll shafts 9. With all four feed roll shafts 9 thus driven in synchronism from the ratchet wheel shaft 36, it follows that each complete oscillation of the segment 33 is adapted to turn the feed rolls 6 and 7 through a predetermined angle to feed a certain amount of wire, for coiling. This coiling feed is preceded and followed by rotation of the rolls to feed wire straight past the arbor 10, with the abutment 12 in its non-coiling position, by mechanism which will next be described.

Figures 5, 5A, 6:
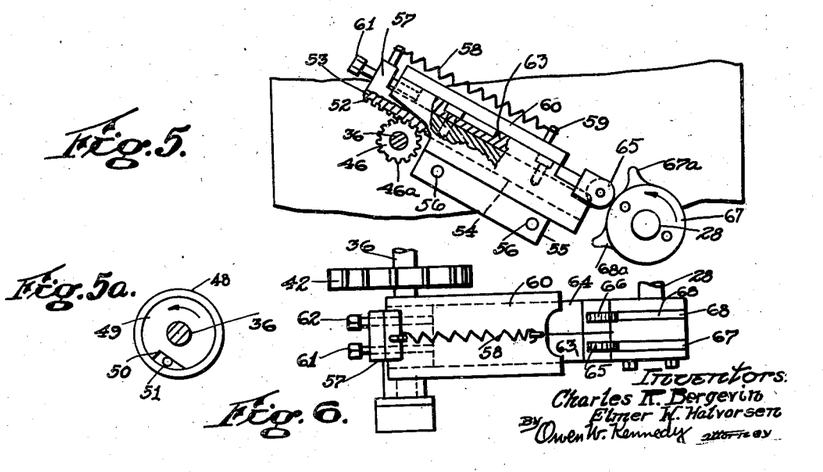
Fig. 5 is a fragmentary view, illustrating the drive for causing the feeding of wire without coiling.
Fig. 5a is a detail view of a portion of the parts of Fig. 5.
Fig. 6 is a plan view of the parts shown in Fig. 5.

As best shown in Figs. 5 and 6, the shaft 36 which carries the feed roll driving gear 42, is extended beyond the frame member 2 and carries a pinion 46 mounted on a sleeve 47 loosely surrounding the shaft 36. The sleeve 47 is connected to one element 48 of a clutch, which is adapted to establish a driving connection between the pinion 46 and the shaft 36 in one direction of rotation only. As shown in Fig. 5a, the clutch element 48 connected to the pinion 46, surrounds a second clutch element 49, in the form of a disk carried by the shaft 36. The element 49 provides a beveled notch 50 in its periphery, and a roller 51 located in the notch 50 serves to establish a driving connection between the clutch elements when the pinion 46 turns in a counterclockwise direction, as viewed in Fig. 5. It is to be noted that the pinion 46 is therefore adapted to drive the shaft 36 in the same direction of rotation as the shaft 36 is driven by the segment 33 through the ratcheting device, to cause the rolls 6 and 7 to feed the wire for coiling, as previously described.

The teeth 46a of the pinion 46 are always in engagement with teeth 52 formed on a rack 53 that is movable within a guide 54, secured to the frame 1 by a bracket extension 55 and screws 56. The rack 53 extends beyond the guide 54 at its toothed end, and provides an upwardly extending lug 57, to which is attached one end of a spring 58. The opposite end of the spring 58 is secured to a lug 59, fixed to a top plate 60 of the guide 54. The rack lug 57 carries a pair of studs 61 and 62 threaded therein, and the inner ends of the studs 61 and 62 bear on the ends of slides 63 and 64, respectively. The slides 63 and 64 extend in parallel relation within the guide 54 and above the rack 53, and the ends of the slides 63 and 64 are provided with rolls 65 and 66, respectively.

As best shown in Fig. 2, the cam shaft 28 is extended beyond the frame member, and carries cams 67 and 68, on which the rolls 65 and 66 bear. In the position of the parts shown in Fig. 5, that is at the start of the formation of a spring, both rolls 65 and 66 are yieldingly maintained in engagement with circular portions of the cams 67 and 68 by the spring 58, acting through the studs 61 and 62 on rack 53. However, as the cam shaft 28 rotates in the direction of the arrow, a projection 67a on cam 67 will move the slide 63 to the left, as viewed in Fig. 5, thereby imparting corresponding movement to the rack 53, by reason of the engagement of the slide 63 with the rack stud 61. This will result in imparting a predetermined amount of rotative movement to the pinion 46 and to the shaft 36 through functioning of the clutch elements 48 and 49. This movement of the shaft 36 is in turn transmitted to the feed rolls 6 and 7 to cause them to feed a predetermined length of wire directly past the arbor 10, and below or above the abutment 12, as shown in Fig. 7. As the roll 65 passes off the cam projection 67a, the spring 58 returns the rack 53, and with it the slide 63, so that the roll 65 again bears on the circular portion of the cam 67; but no rotation is imparted to the shaft 36 on this return movement, due to the fact that roller 51 does not transmit power between the clutch elements 48 and 49.

The angular position of the cam projection 67a on the shaft 28 is such that during substantially the next half revolution, or more, of the cam shaft, the segment 33 operates to impart rotation to the feed rolls 6 and 7, for the purpose of forming a coil on the arbor 10. As will be hereinafter described, the abutment 12 is moved from the position of Fig. 7 to the position of Fig. 9, in the dwell between rotation of the rolls 6 and 7 to feed wire directly past the arbor 10, and the resumed rotation of the rolls for the purpose of coiling. After the segment 33 has completed its stroke in the feeding direction, the rolls again come to rest, by which time a projection 68a on the cam 68, has turned sufficiently to approach the roll 66 on slide 64.

Before the cam projection 68a engages roll 66, the abutment 12 has been turned from the position of Fig. 9 to the position of Fig. 11, and the arbor 10 has been entirely withdrawn from the previously formed coil, as indicated in Fig. 12. Therefore, when engagement of the roll 66 by the cam projection 68a moves the slide 64 and with it the rack 53 to the left, the resulting rotation of the feed rolls by movement of the rack 53, causes the entire coil to be shifted past the abutment 12, as the wire is fed a predetermined amount. Return of the rack 53 by the spring 58, as the roll 66 passes off the cam projection 68a, results in no further movement of the shaft 36, so that the stationary wire may then be severed by the cutting tool 13, and the completed spring appears as shown in Fig. 13, with two extended ends. At this point, the cam shaft 28 has completed substantially one revolution from its starting position, and the cam projection 67a again occupies the position of Fig. 5, in readiness for another cycle of wire feeding, coiling and cutting operations. Obviously, the amount of wire fed directly past the arbor 10 to form each spring end, may be controlled accurately by adjustment of the set screws 61 and 62, to vary the initial relation between teeth 52 and 46a on the rack 52 and pinion 46, respectively.

As pointed out above, the movement of the abutment 12 is closely synchronized with the intermittent feeding movement of the feed rolls 6 and 7, and the mechanism for controlling the different positions of the abutment will next be described.

*Coiling abutment control*

Figure 4:
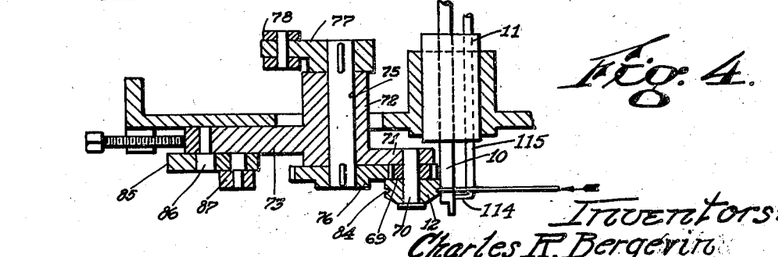
Fig. 4 is a horizontal sectional view, along the line 4—4 of Fig. 1, on an enlarged scale.

As best shown in Figs. 1, 4 and 7, the coiling abutment 12 is in the form of a disk, slabbed off along one face to provide a diametrical surface 12a, in exact alinement with the line of wire feed at the start of the spring forming cycle. A pinion 69 is attached to the rear surface of the abutment 12, and the abutment 12 and pinion 69 are freely rotatable on a pin 70. The pin 70 is attached to an arm 71 projecting from a cylindrical bearing sleeve 72, forming part of a slide 73 that is horizontally movable between ways 74 extending at right angles to the axis of the arbor 10. A shaft 75, rotatably mounted in the sleeve 72, carries at one end a gear 76, in mesh with the pinion 69, that is turnable with the abutment 12. The opposite end of the shaft 75 carries an arm 77 pivotally connected by a link 78 to a lever 79 that cooperates with a pivoted arm 80 carrying a roll 81, bearing on the face of a cam 82, and yieldingly held in engagement therewith by means of a spring 83, see Fig. 1. The cam 82 is mounted on the shaft 28, which, as previously described, is continuously driven from the gear 35, and carries the cams 67 and 68 for controlling the straight feeding of wire by the rolls 6 and 7.

The broken-away portion of Fig. 1 represents a fragmentary section along the line 1—1 of Fig. 2, so that the cam 82 appears in side elevation. From the form of the cam 82, it is apparent that once during each revolution of the cam shaft 28, the abutment 12 will be moved from the position of Fig. 7 to the position of Fig. 9, and that the abutment will remain in each position for a period somewhat less than one-half a revolution of the cam shaft 28. The cam 82 is so timed with reference to the cam 67, that following the feeding of an uncoiled length of wire over the arbor 10 and under the abutment 12, movement of the arm 77 by turning of the lever 79, will cause the gear 76 to turn the abutment pinion 69 through an angle of substantially 90°. When this occurs, the abutment 12 will bend down the uncoiled length of wire just fed, into the position of Fig. 9, wherein the wire bears on the semicircular surface of the abutment, which is provided with a groove 84, to receive the wire, as shown in Fig. 4. Therefore, when the rolls 6 and 7 are next driven by the operative stroke of the segment 33, the wire is deflected by the abutment 12, as it is fed over the arbor 10 and is coiled into a spring, as indicated in Figs. 9 and 10.

The abutment 12 is not turned on its axis during the coiling operation, but after the feed rolls 6 and 7 come to rest, rotation of the cam 82 permits the spring 83 to return the lever 79 to the initial position shown in Fig. 1, wherein the flat surface 12a of the abutment is again in exact alinement with the wire feed. The abutment 12 remains in this position while the cam 68 operates the feed slide 64 and rack 53 to cause the rolls 6 and 7 to again feed a predetermined length of wire without coiling, and thereby shift the coiled spring to the position of Fig. 12. The abutment 12 remains in this position while the wire is severed, and while the extended end of the spring next to be coiled is fed past the arbor by functioning of the cam 67.

As previously pointed out, the arm 71 and sleeve 72 carrying the abutment 12 and its drive gearing, form part of a slide 73 that is movable between ways 74. The object of this mounting of the slide 73 is to permit the abutment 12 to be moved with reference to the axis of coiling, to control the diameter of the spring being coiled. Reciprocatory movement is adapted to be imparted to the slide 73, by means of a link 85 connected at its end to a pin 86 on the slide, and to a crank arm 87. The arm 87 is turnable with a shaft 88, extending through the frame 1 and provided at its inner end with an operating arm 89. The arm 89 is connected by a link 90 to a lever 91, see Fig. 2, mounted on the same axis as the lever 79. The lever 91 cooperates with a pivoted arm 92 mounted on the same axis as the arm 80, and the arm 92 carries a roll bearing on the face of a cam 93 carried by the shaft 28. It is obvious that turning movement imparted to the lever 91, will cause the shaft 88 to be turned and so move the coiling abutment slide 73 back and forth with reference to the coiling axis, and thereby cause the abutment 12 to control the diameter of the spring being coiled. With the cam 93 concentric about the axis of shaft 28, a cylindrical spring will be coiled, but by varying the form of the cam 93, it is possible to produce springs of varying contour, such as cone springs or barrel springs, all of which will be provided with extended ends by control of the movement of the feed rolls by the cams 67 and 68.

As previously indicated, turning of the abutment 12 on its axis is coordinated with axial movement of the arbor 10, first to support a spring as it is coiled, and then to clear a coiled spring to permit bodily shifting of the spring by the feeding of the wire to form the second coil end. The mechanism for control of the coiling arbor 10 to provide for coiling, shifting of the coil and finally severance thereof, will next be described.

*Coiling arbor and cutter control*

As best shown in Figs. 2 and 4, the coiling arbor 10 is slidably mounted in the tool holder 11, so as to be capable of longitudinal movement at right angles to the line of wire feed. The rear end of the arbor 10 is secured by means of a connector 94 and pivot 95 to a rod 96, the opposite end of which is pivotally connected to one arm 97 of a bell crank lever, pivotally supported on a bracket 98, projecting from the frame 2. The other arm 99 of the lever is connected by a link 100 to an arm 101 mounted on the same shaft as the cam roll arms 80 and 92. The arm 101 carries a roll 102, yieldingly maintained in engagement with a cam 103 on the shaft 28 by a spring 104, acting on the lever arm 97.

The form of the cam 103 is such that at the start of the wire feeding operation, the arbor occupies the position of Fig. 8, so that when the abutment 12 is moved into the coiling position of Fig. 10, the arbor 10 supports the wire 4 as it is fed for coiling. However, in the interval between the wire coiling feed and the second feed, the cam 103 permits the spring 104 to move the arbor 10 to the left, as viewed in Fig. 2, thereby entirely withdrawing the arbor from the spring just coiled, as shown in Fig. 12, to permit the second end feed by the rolls to shift the entire spring beneath and beyond the abutment 12. When this feed has been completed, the cam 103 moves the arbor 10 to the dotted line position of Fig. 12, thereby positioning the slabbed-off end 10a of the arbor with its vertical surface in alinement with the cutting edge of the tool 13, then in the position of Fig. 11.

As best shown in Fig. 1, the cutter 13 is carried by a block 105, vertically movable between ways 106 by an arm 107, turnable with a cutter shaft 108. The shaft 108 extends rearwardly between the frames 1 and 2, as shown in Fig. 2, which also shows a shaft 109 parallel to the shaft 108, for operating a second cutting tool for cutting left-hand springs, this tool being indicated only in dotted lines in Fig. 1. The cutter tool shafts 108 and 109 are connected together for oscillatory movement in unison, by mechanism fully shown and described in the aforementioned Patent No. 2,119,002.

For the purposes of the present application, it is sufficient to state that the upper shaft 108 carries a projecting arm 110, which is connected by a link 111 to an arm 112, rotatable on the same axis as the arm 101. A roll carried by the arm 112 cooperates with a cam 113, which is so designed as to impart an oscillatory movement to the cutter shafts 108 and 109 in the interval between the second coil end feed to shift the coil, and the first coil end feed to start the formation of the next spring. Obviously, oscillatory movement imparted to the cutter shaft 108 will cause the cutter 113 to move quickly downward, to sever the wire then supported on the cutting portion 10a of the arbor 10, and then as quickly return to its normal position, entirely clear of the line of wire feed. When this occurs, the completed spring is severed from the wire, and appears as shown in Fig. 13, with extended ends E projecting from the coiled body S.

While the spring S shown in Fig. 13 is shown as having convolutions closely coiled together, the machine provides a pitch tool 114, indicated in Fig. 1 as being disposed with an edge adapted to bear on the first convolution of wire after it is coiled, to determine the pitch. The pitch tool 114 is mounted on a rod 115, longitudinally movable within the tool holder 11, as indicated in Fig. 4. This rod 115 does not show in Fig. 2, since it is behind the arbor 10, but one end is connected to the lower end of one arm 116 of a bell crank lever, as indicated in dotted lines. The other arm 117 of this lever is connected by a link 118 to a lever 119, cooperating through a pivoted arm 120 and roller, with a cam 121 on shaft 28. The cam 121 is so designed that after the first convolution of a spring has been formed, the pitch tool 114 presses against the end of the convolution in such a manner as to deflect the wire continuously into a series of spirals of the required pitch. The adjustment of the pitch tool 114, as well as adjustment of the degree of movement of the coiling abutment slide 73, to control the diameter of the spring being coiled, is obtained by means of hand wheels 122 and 123, respectively, in the manner fully set forth and described in the aforesaid Patent No. 2,119,002, so that such adjustment need not be further described herein.

*Operation of the machine*

Referring now to Fig. 14, there is shown diagrammatically, the time relation between the various steps in the formation of a spring with extended ends, with reference to one complete revolution of the cam shaft 28. At the start of the spring forming operation, indicated by the zero mark on the diagram, the feed rolls 6 and 7 are stationary, due to the fact that at this particular moment the segment 33 is substantially midway in its return stroke, so that no rotation is imparted to the shaft 36 by the ratcheting device.

It may also be assumed that at the zero point of the cycle, the cam projection 67a is as shown in Fig. 5, where it is just about to engage the roll 65. At this particular moment also, the abutment 12 is stationary, with surface 12a in exact register with the line of wire feed. Therefore, movement of the rack 53 by the cam 67, causes the first uncoiled wire length to be fed past the arbor 10 and under the abutment 12. The amplitude of this first end feed, indicated by the angular displacement on the diagram of Fig. 14, is purely relative, and obviously, the amount of feed may be varied through the form of the cam projection 67a and the setting of the stud 61.

As the rolls 6 and 7 come to rest at the end of the first feed, as indicated by the dwell on the diagram of Fig. 14, the abutment 12 is turned on its axis from the position of Fig. 7 to the position of Fig. 9, by operation of the cam 82 acting through the link 78. This bends the first uncoiled length previously fed, downwardly, as indicated in Fig. 9. After bending of the first fed length of the wire, the segment 33 starts on its working stroke, in which the shaft 36 is driven by the pawl 46. This cause the feed rolls 6 and 7 to feed and coil a predetermined length of wire with the desired diameter and pitch, since the abutment 12 then acts as a coiling point.

While the segment feed is indicated as occupying substantially one-half revolution, obviously, this feed can be varied widely by means of adjustment of the block 29 carrying the crank pin 30, all as fully set forth and described in the aforesaid Patent No. 2,119,002, the diagram of Fig. 14 being merely illustrative of the general relations between the various operations in the spring forming cycle, in point of time.

As the feed rolls come to rest after the coiling feed, the arbor is withdrawn to the position of Fig. 12, through operation of the cam 103, and at substantially the same time, the cam 82 turns the abutment to the position of Fig. 11, wherein the surface 12a is again in register with the line of wire feed. With the arbor 10 and the abutment 12 in the position of Fig. 11, the second rack cam 68 operates the slide 64 to again turn the shaft 36 to cause the second end feed of the wire. Since the previously coiled spring is then clear of the withdrawn arbor 10, the whole coil shifts bodily into the position of Fig. 12, after which the rolls 6 and 7 again come to rest.

In the third dwell, indicated on the diagram, and in advance of the zero point which was taken as the start of the cycle, the cutter cam 113 operates the link 111 to impart a quick oscillatory movement to the cutter shaft 108. This results in downward movement of the tool 13 to sever the completed spring, followed by upward movement of tool 13 to its original position, and as the wire is at that moment stationary, the cycle ends with the end of the wire stock located at the top of the arbor 10, when the latter returns to the position of Fig. 8, so that all is in readiness to start the formation of a new spring, when the rack cam 67 again operates its slide 63.

From the foregoing, it is apparent that by the present invention there is provided an improved machine and method of coiling springs of the torsion type, characterized by the provision of uncoiled ends extending at an angle to the spring axis.

As previously indicated, the invention can also be embodied in a clutch-type spring coiling machine, wherein the intermittent rotative movement of the feed rolls is controlled by a clutch mechanism. Such a clutch-type machine is shown in Spuhl Patent No. 351,220, issued October 19, 1886, and there will next be described with reference to Figs. 15 to 18, inclusive, only as much of the essential elements of such a machine as is necessary for an understanding of the present invention.

Figure 15:
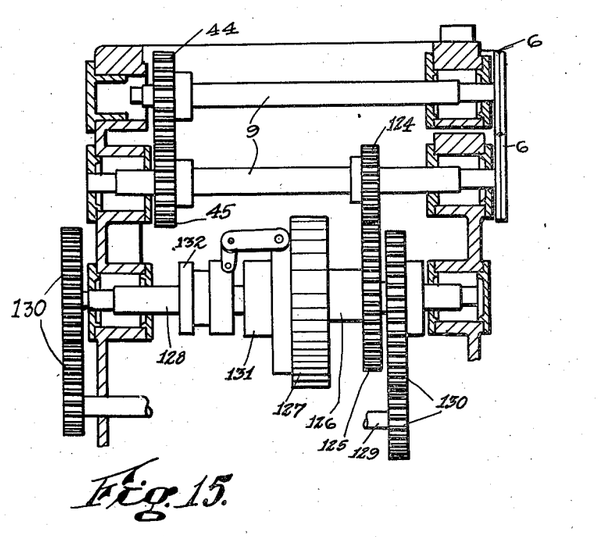
Fig. 15 is a view similar to Fig. 3, showing the invention applied to a clutch-type coiler.

In Fig. 15, the feed rolls 6, mounted on the shafts 9, are adapted to be driven in unison through gears 44 and 45, with a driving-gear 124 carried by the lower shaft 9. The gear 124 is in mesh with a gear 125, carried by a sleeve 126 turnable with the driven element 127 of a clutch mounted on a shaft 128 connected to the drive shaft 129 of the machine, through gearing 130.

Figures 16, 17, 18:
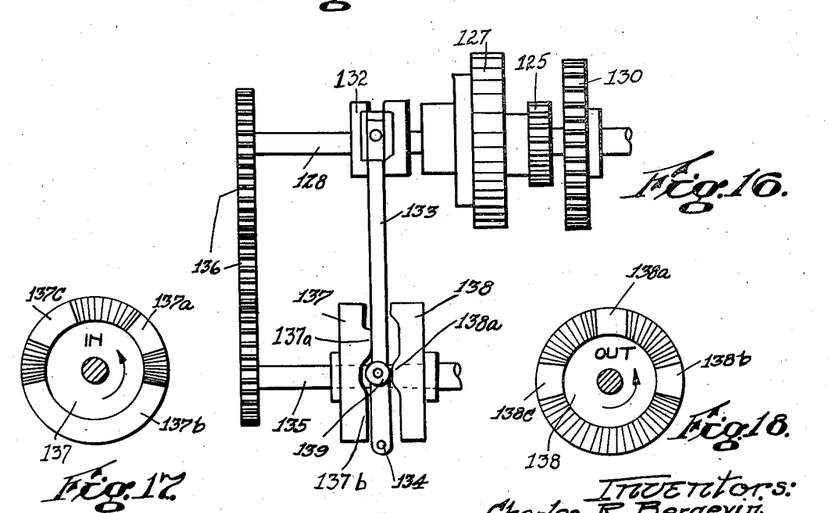
Fig. 16 is a plan view of a portion of the parts shown in Fig. 15.
Figs. 17 and 18 are detail views of the cams shown in Fig. 16.

The driving element 131 of the clutch is connected to the shaft 128, and when the clutch elements 127 and 131 are disengaged, the clutch shaft 128 turns without imparting rotative movement to the feed rolls 6. The clutch elements are adapted to be thrown into or out of operative engagement by a collar 132 slidable on the shaft 128, and the collar 132 is operable by means of a lever 133, pivoted at 134, as shown in Fig. 16.

The lever 133 extends over a cam shaft 135, only a portion of which is shown, and this shaft is connected to the clutch shaft 128 by a train of gears 136. Obviously, the speed of the cam shaft 135 can be varied by changing the ratios of the gears 136, in order to obtain any desired speed relation between the clutch shaft 128 and the cam shaft 135.

The cam shaft 135 carries a pair of cams 137 and 138, and the clutch operating lever 133 carries a roll 139, disposed between the operating faces of the cams. For the purpose of throwing the clutch in and out to obtain intermittent rotative movement of the feed rolls 6, the cams 137 and 138 provide cooperating projections 137a, 137b and 137c and 138a, 138b and 138c, respectively. For purposes of illustration, these cam projections are indicated as having substantially the same angular relations necessary to cause intermittent feeding of the wire, substantially in accordance with the operating cycle, previously described with reference to Fig. 14.

Assuming that the cam shaft 135 starts to rotate with the cam projection 138a holding the clutch elements 131 and 127 disengaged, it is evident that the cam projection 137a will next engage the lever roll 139, to throw the clutch in to cause the rolls 6 to feed the first coil end. The cam projection 138b will then throw out the clutch to bring the feed rolls to rest, during which interval the coil end is bent down by the abutment 12, as shown in Fig. 9. The cam projection 137b then again engages the clutch elements to cause feeding of the wire for coiling, followed by stoppage of the rolls 6, as the cam projection 138c again throws out the clutch. During the ensuing interval, the abutment 12 is turned to the position of Fig. 11, followed by the second feed of a coil end when the cam projection 137c throws in the clutch. Operation of the clutch lever 133 by the cam projection 138a completes the cycle, and during this last dwell in the wire feed, the cutter 13 operates, as previously described.

In order to simplify the showing of the invention, as embodied in a clutch-type machine, only a portion of the cam shaft 135 is shown. It is to be understood, however, that the shaft 135 also carries the various cams, designated 82, 93, 103, 113 and 121, functioning as previously described, to control operation of the arbor 10, abutment 12 and cutting tools 13, as well as for controlling the diameter and pitch of the spring being coiled.

We claim:

1. In a spring coiling machine, the combination with feed rolls capable of intermittent rotative movement, a coiling arbor and a coiling abutment, of means for controlling the rotative movement of said rolls and the relative positions of said abutment and arbor to successively cause the feeding of a length of wire, the feeding of said wire into a coil, and finally the feeding of a second length of wire continuous with one end of said coil.

2. In a spring coiling machine, the combination with feed rolls capable of intermittent rotative movement, a coiling arbor and a coiling abutment, of means for controlling the rotative movement of said rolls and the relative positions of said abutment and arbor to successively cause the feeding of a predetermined length of wire past said arbor and said abutment, the feeding and the flexure of said wire against said abutment into a coil of predetermined length, and finally the feeding of a second predetermined length of wire continuous with one end of said coil.

3. In a spring coiling machine, the combination with feed rolls capable of intermittent rotative movement, a coiling arbor and a coiling abutment, of means for controlling the rotative movement of said rolls and the relative positions of said abutment and arbor to successively cause the feeding of a predetermined length of wire past said arbor and said abutment, the feeding and the flexure of said wire against said abutment into a coil of predetermined length, and finally the feeding of a second predetermined length of wire continuous with one end of said coil, and means for severing said coil from the wire in an interval between successive rotative movements of said rolls to feed the wire without coiling.

4. In a spring coiling machine, the combination with feed rolls capable of intermittent rotative movement, a coiling arbor and a coiling abutment capable of angular and translatory movement, with respect to the axis of said arbor, of means for controlling the rotative movement of said feed rolls and for controlling the relative positions of said arbor and abutment, to form wire fed by said rolls into a coil spring with extended ends.

5. In a spring coiling machine, the combination with feed rolls capable of intermittent rotative movement, a coiling arbor and a coiling abutment capable of angular and translatory movement with respect to the axis of said arbor, of means for controlling the rotative movement of said feed rolls and for controlling the relative positions of said arbor and abutment, to form wire fed by said rolls into a coil spring with convolutions of different diameters and extended ends of predetermined length.

6. In a spring coiling machine, the combination with feed rolls capable of intermittent rotative movement, a coiling arbor and a coiling abutment capable of angular and translatory movement with respect to the axis of said arbor, of means for controlling the rotative movement of said feed rolls and for controlling the relative positions of said arbor and abutment, to form wire fed by said rolls into a coil spring with convolutions of varying pitch and with extended ends of predetermined length.

7. In a spring coiling machine, the combination with feed rolls capable of intermittent rotative movement, a coiling arbor and a coiling abutment capable of angular and translatory movement with respect to the axis of said arbor, of means for controlling the rotative movement of said feed rolls and for controlling the relative positions of said arbor and abutment, to form wire fed by said rolls into a coil spring with convolutions of different diameters, and of varying pitch, and with extended ends of predetermined length.

8. In a spring coiling machine, the combination with rolls capable of intermittent rotative movement, a coiling arbor, and an abutment capable of angular movement with respect to the arbor axis, of means for controlling the position of said abutment to either deflect wire fed by said rolls into a coil, or to permit its unobstructed passage beyond said arbor.

9. In a spring coiling machine, the combination with rolls capable of intermittent rotative movement, a coiling arbor, and an abutment capable of angular movement with respect to the arbor axis, of means for controlling the position of said abutment to either deflect wire fed by said rolls into a coil, or to permit its unobstructed passage beyond said arbor, and means for positively determining the particular portion of said abutment against which the wire is deflected in coiling.

10. In a spring coiling machine, the combination with rolls capable of intermittent rotative movement, a coiling arbor and an abutment capable of both angular and translatory movement with respect to the arbor axis, of means for controlling the position of said abutment to either deflect wire fed by said rolls into a coil with convolutions of different diameters, or permit unobstructed passage of predetermined lengths of wire beyond said arbor.

11. In a spring coiling machine, the combination with feed rolls capable of intermittent rotative movement, a coiling arbor, a coiling abutment, and a wire cutting tool, of means for controlling the rotative movement of said rolls, and the relative positions of said arbor, abutment and cutting tool to successively cause feeding of a predetermined length of wire past said arbor and abutment, the feeding and simultaneous deflection of said wire against said abutment into a coil of predetermined length, the feeding of a second predetermined length of wire continuous with said coil, and finally the severance of said wire by said cutting tool.

12. In a spring coiling machine the combination with rotary feed rolls, a coiling arbor capable of axial movement and a coiling abutment turnable on an axis parallel to the axis of said arbor, of means for intermittently rotating said feed rolls to successively cause the feeding of a length of wire past said arbor and abutment, the feeding and deflection of said wire against said abutment and around said arbor into a coil of predetermined length, and finally, the feeding of a second length of wire past said arbor and abutment, with said arbor withdrawn from its coiling position.

13. In a spring coiling machine the combination with rotary feed rolls, a coiling arbor capable of axial movement and a coiling abutment turnable on an axis parallel to the axis of said arbor, of means for intermittently rotating said feed rolls to successively cause the feeding of a length of wire past said arbor and abutment, the feeding and deflection of said wire against said abutment and around said arbor into a coil of predetermined length, and the feeding of a second straight length of wire past said arbor and abutment, with said arbor withdrawn from its coiling position, and means for severing said wire on said arbor after feeding of the second length, to provide a coil spring with extending ends.

14. In a spring coiling machine the combination with rotary feed rolls, a coiling arbor and a coiling abutment turnable on an axis parallel to the axis of said arbor, of means for rotating said feed rolls to cause feeding of a length of wire past said arbor and said abutment, means for turning said abutment on its axis, while said rolls remain stationary, and means for again rotating said rolls to cause the feeding and the deflection of said wire against said abutment and around said arbor, into a coil of predetermined length.

15. In a spring coiling machine the combination with rotary feed rolls, a coiling arbor and a coiling abutment turnable on an axis parallel to the axis of said arbor, of means for rotating said feed rolls to cause feeding of a length of wire past said arbor and said abutment, means for turning said abutment on its axis, while said rolls remain stationary, means for again rotating said rolls to cause the feeding and deflection of said wire against said abutment and around said arbor into a coil of predetermined length, means for turning said abutment back to its original position, while said rolls remain stationary, and means for again rotating said rolls to cause the feeding of a second length of wire continuous with one end of said coil.

16. In a spring coiling machine the combination with rotary feed rolls, a coiling arbor and a coiling abutment turnable on an axis parallel to the axis of said arbor, of means for rotating said feed rolls to cause feeding of a length of wire past said arbor and said abutment, means for turning said abutment on its axis, while said rolls remain stationary, means for again rotating said rolls to cause the feeding and deflection of said wire against said abutment and around said arbor into a coil of predetermined length, means for turning said abutment back to its original position, while said rolls remain stationary, means for again rotating said rolls to cause the feeding of a second straight length of wire continuous with one end of said coil, and means for severing said wire while said rolls remain stationary, to provide a coiled spring with extending ends.

CHARLES R. BERGEVIN.
ELMER W. HALVORSEN.